United States Patent
Morgan

(10) Patent No.: US 6,402,650 B1
(45) Date of Patent: Jun. 11, 2002

(54) MECHANICAL TORQUE ENHANCING ASSEMBLY

(76) Inventor: John Morgan, 103 Ridge View Cir., Rocklin, CA (US) 95677

( * ) Notice: Subject to any disclaimer, the term of this patent is extended or adjusted under 35 U.S.C. 154(b) by 0 days.

(21) Appl. No.: 09/612,083

(22) Filed: Jul. 7, 2000

(51) Int. Cl.[7] ............................................. F16H 55/34
(52) U.S. Cl. .................................... 474/182; 474/160
(58) Field of Search ......................... 474/95, 160, 166, 474/174, 179, 182, 183, 199

(56) References Cited

U.S. PATENT DOCUMENTS

| | | | |
|---|---|---|---|
| 3,954,017 A | * | 5/1976 | Musgrove ................. 74/230.4 |
| 4,352,503 A | | 10/1982 | Cotter |
| 4,373,926 A | * | 2/1983 | Fullerton .................... 474/57 |
| D283,415 S | | 4/1986 | Ishikawa |
| 4,671,783 A | * | 6/1987 | Seymour .................... 474/148 |
| 4,701,152 A | | 10/1987 | Dutil et al. |
| 4,713,043 A | | 12/1987 | Bledermann |
| 4,836,046 A | | 6/1989 | Chappel |
| 5,035,678 A | * | 7/1991 | Hageman .................... 474/50 |
| 5,048,358 A | * | 9/1991 | Shook ......................... 74/112 |
| 5,295,916 A | | 3/1994 | Chattin |
| 5,328,417 A | * | 7/1994 | Cline et al. ................. 474/179 |
| 6,089,833 A | * | 7/2000 | Glanfield et al. ........... 417/362 |
| 6,199,449 B1 | * | 3/2001 | Harrington ................. 74/594.1 |

* cited by examiner

*Primary Examiner*—David A. Bucci
*Assistant Examiner*—Vicky A. Johnson

(57) ABSTRACT

A mechanical torque enhancing assembly for increasing the torque output of a pulley. The mechanical torque enhancing assembly includes a drum assembly that has an interior space, a belt receiving groove that extends around an outer perimeter edge of the drum assembly, a converter plate, and a plurality of drive pins coupled to the interior space. The plurality of drive pins are each positioned proximate the belt receiving groove at a predetermined spaced distance from each other. A plurality of drive panels that have a first end and a second end are also positioned within the interior space of the drum assembly. The first end of each of the drive panels is coupled to an associated drive pin. The second end of each of the drive panels is coupled to the converter plate. Thus, when the drum assembly rotates each of the drive panels acts as a lever and the converter plate acts as a fulcrum thereby increasing the torque on the converter plate. In addition, the converter plate has an axle for providing rotational power.

8 Claims, 2 Drawing Sheets

MECHANICAL TORQUE ENHANCING ASSEMBLY

BACKGROUND OF THE INVENTION

1. Field of the Invention

The present invention relates to mechanical pulleys and more particularly pertains to a new mechanical torque enhancing assembly for increasing the torque output of a pulley.

2. Description of the Prior Art

The use of mechanical pulleys is known in the prior art. More specifically, mechanical pulleys heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,295,916; 4,836,046; 4,701,152; 4,352,503; 4,713,043; and U.S. Pat. No. Des. 283,415.

While these devices fulfill their respective, particular objectives and requirements, the aforementioned patents do not disclose a new mechanical torque enhancing assembly. The inventive device includes a drum assembly that has an interior space, a belt receiving groove that extends around an outer perimeter edge of the drum assembly, a converter plate, and a plurality of drive pins coupled to the interior space. The plurality of drive pins are each positioned proximate the belt receiving groove at a predetermined spaced distance from each other. A plurality of drive panels that have a first end and a second end are also positioned within the interior space of the drum assembly. The first end of each of the drive panels is coupled to an associated drive pin. The second end of each of the drive panels is coupled to the converter plate. Thus, when the drum assembly rotates each of the drive panels acts as a lever and the converter plate acts as a fulcrum thereby increasing the torque on the converter plate. In addition, the converter plate has an axle for providing rotational power.

In these respects, the mechanical torque enhancing assembly according to the present invention substantially departs from the conventional concepts and designs of the prior art, and in so doing provides an apparatus primarily developed for the purpose of increasing the torque output of a pulley.

SUMMARY OF THE INVENTION

In view of the foregoing disadvantages inherent in the known types of mechanical pulleys now present in the prior art, the present invention provides a new mechanical torque enhancing assembly construction wherein the same can be utilized for increasing the torque output of a pulley.

The general purpose of the present invention, which will be described subsequently in greater detail, is to provide a new mechanical torque enhancing assembly apparatus and method which has many of the advantages of the mechanical pulleys mentioned heretofore and many novel features that result in a new mechanical torque enhancing assembly which is not anticipated, rendered obvious, suggested, or even implied by any of the prior art mechanical pulleys, either alone or in any combination thereof.

To attain this, the present invention generally comprises a drum assembly that has an interior space, a belt receiving groove that extends around an outer perimeter edge of the drum assembly, a converter plate, and a plurality of drive pins coupled to the interior space. The plurality of drive pins are each positioned proximate the belt receiving groove at a predetermined spaced distance from each other. A plurality of drive panels that have a first end and a second end are also positioned within the interior space of the drum assembly. The first end of each of the drive panels is coupled to an associated drive pin. The second end of each of the drive panels is coupled to the converter plate. Thus, when the drum assembly rotates each of the drive panels acts as a lever and the converter plate acts as a fulcrum thereby increasing the torque on the converter plate. In addition, the converter plate has an axle for providing rotational power.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new mechanical torque enhancing assembly apparatus and method which has many of the advantages of the mechanical pulleys mentioned heretofore and many novel features that result in a new mechanical torque enhancing assembly which is not anticipated, rendered obvious, suggested, or even implied by any of the prior art mechanical pulleys, either alone or in any combination thereof.

It is another object of the present invention to provide a new mechanical torque enhancing assembly which may be easily and efficiently manufactured and marketed.

It is a further object of the present invention to provide a new mechanical torque enhancing assembly which is of a durable and reliable construction.

An even further object of the present invention is to provide a new mechanical torque enhancing assembly which is susceptible of a low cost of manufacture with regard to both materials and labor, and which accordingly is then susceptible of low prices of sale to the consuming public, thereby making such mechanical torque enhancing assembly economically available to the buying public.

Still yet another object of the present invention is to provide a new mechanical torque enhancing assembly which provides in the apparatuses and methods of the prior art some of the advantages thereof, while simultaneously overcoming some of the disadvantages normally associated therewith.

Still another object of the present invention is to provide a new mechanical torque enhancing assembly for increasing the torque output of a pulley.

Yet another object of the present invention is to provide a new mechanical torque enhancing assembly which includes a drum assembly that has an interior space, a belt receiving groove that extends around an outer perimeter edge of the drum assembly, a converter plate, and a plurality of drive pins coupled to the interior space. The plurality of drive pins are each positioned proximate the belt receiving groove at a predetermined spaced distance from each other. A plurality of drive panels that have a first end and a second end are also positioned within the interior space of the drum assembly. The first end of each of the drive panels is coupled to an associated drive pin. The second end of each of the drive panels is coupled to the converter plate. Thus, when the drum assembly rotates each of the drive panels acts as a lever and the converter plate acts as a fulcrum thereby increasing the torque on the converter plate. In addition, the converter plate has an axle for providing rotational power.

Still yet another object of the present invention is to provide a new mechanical torque enhancing assembly that allow a user to use a smaller engine and still have the required output torque.

Even still another object of the present invention is to provide a new mechanical torque enhancing assembly that could be used on anything that turns on an axle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
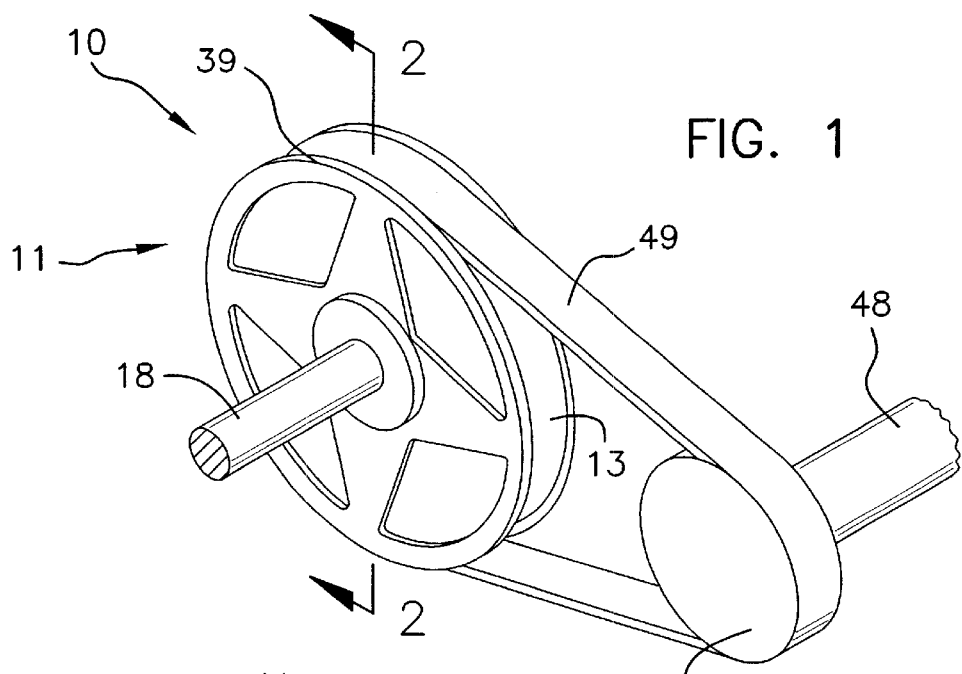
FIG. 1 is a schematic perspective view of a new mechanical torque enhancing assembly according to the present invention.
Figure 2:
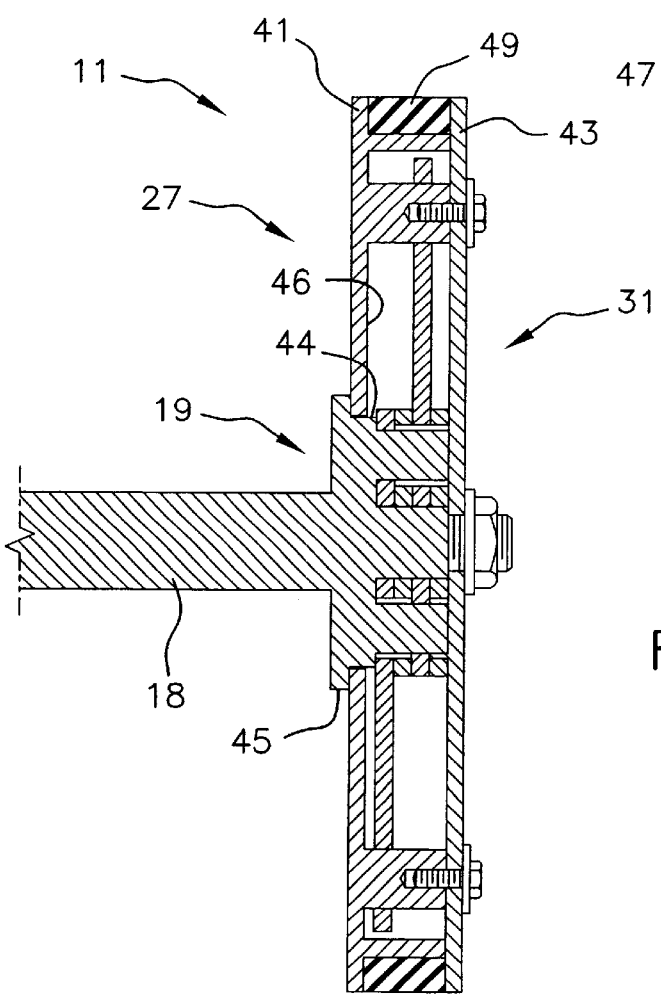
FIG. 2 is a schematic cross-sectional view of the present invention.
Figure 3:
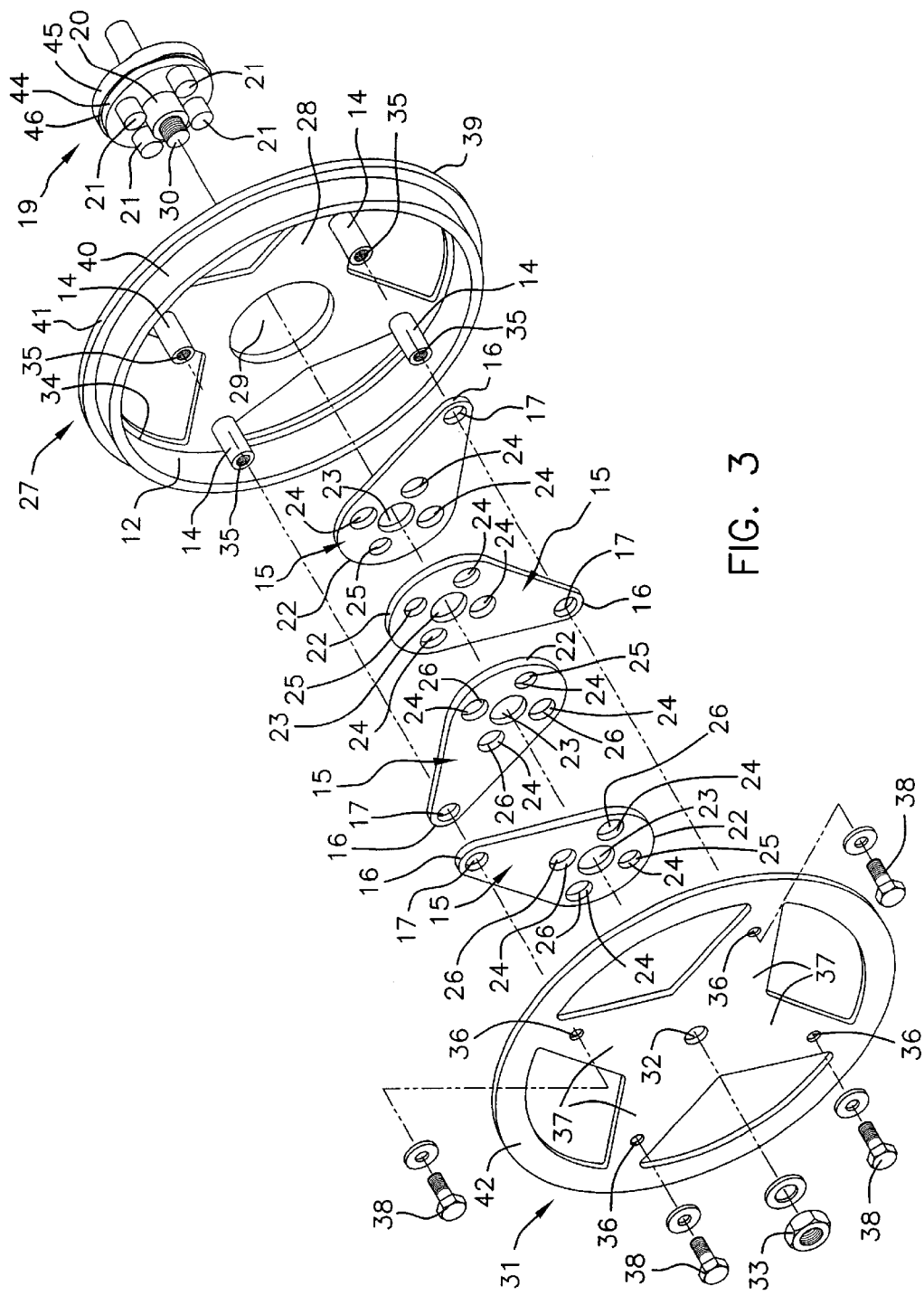
FIG. 3 is a schematic exploded view of the present invention.

With reference now to the drawings, and in particular to FIGS. 1 through 3 thereof, a new mechanical torque enhancing assembly embodying the principles and concepts of the present invention and generally designated by the reference numeral 10 will be described.

As best illustrated in FIGS. 1 through 3, the mechanical torque enhancing assembly 10 generally comprises a drum assembly 11 that has an interior space 12. A belt receiving groove 13 extends around an outer perimeter edge of the drum assembly 11. In addition, a plurality of drive pins 14 are positioned within the interior space 12. Each of the drive pins 14 are positioned proximate the belt receiving groove 13 for maximizing torque generation.

The mechanical torque enhancing assembly 10 also has a plurality of drive panels 15. The drive panels 15 are positioned within the interior space of the drum assembly 11. Each of the drive panels has a first end 16. The first end 16 of each drive panel 15 has a drive pin aperture 17. The drive pin aperture 17 is engaged to an associated one of the drive pins 14.

The mechanical torque enhancing assembly 10 further has an axle 18 with a converter plate 19. The axle 18 is designed for providing rotational power and may be coupled to a transmission. The converter plate 19 has a central pin 20 and a plurality of converter plate pins 21 positioned around the central pin 20.

Each of the drive panels 15 has a second end 22. The second end 22 of each drive panel 15 has a central pin aperture 23 and a plurality of converter plate pin apertures 24. The central pin aperture 23 receives the central pin 20 of the converter plate 19. Each of the converter plate pins 21 receives an associate one of the converter plate pins 21. Thus the second end 22 of each of the drive panels 15 is engaged to the converter plate 19 in such a manner that rotation of the drum assembly 11 rotates the converter plate 19.

The plurality of converter plate pin apertures 24 on each drive panel includes a drive converter plate pin aperture 25. The drive converter plate pin aperture 25 is substantially aligned with the central pin aperture 23 and the drive pin aperture 17. Moreover, the drive converter plate pin aperture 25 is positioned in manner such that the central pin aperture 23 is positioned between the drive converter plate pin aperture 25 and the drive pin aperture 17.

The drive converter plate pin aperture 25 of an associated drive panel 15 engages an associated one of the converter plate pins 21 that is positioned in alignment with the central pin 20 and a drive pin 14. Moreover, the central pin 20 is positioned between the associated one of the converter plate pins 21 and the drive pin 14 associated with the drive panel 15.

The plurality of converter plate pin apertures 21 of each drive panel includes a plurality of clearance apertures 26. Each clearance aperture 26 receives a respective one of the converter plate pins 21.

The drum assembly 11 includes a first drum member 27 that has a plate portion 28. The plate portion 28 has a central opening 29 for receiving the converter plate 19.

The central pin 20 of the converter plate 19 has a distal threaded portion 30. The drum assembly 11 also includes a second drum member 31. The second drum member 31 has a central hole 32 that receives the distal threaded portion 30 of the central pin 20 therethrough. A connection member 33 engages the distal threaded portion 30 of the central pin 20. Thus the second drum member 31 is engaged to the converter plate 19.

A plurality of spokes 34 extend outward from the central opening 29 of the plate portion 28 of the first plate 27. The drive pins 14 extend from the spokes 34 of the plate portion 28. Each of the drive pins 14 has a threaded bore 35 therein. The second drum member 31 also has a plurality of second spokes 37 that extend from the central hole 32. A plurality of connection apertures 36 are positioned in the second spokes 37. Each of the connection apertures 36 are aligned with an associated one of the threaded bores 35 of the drive pins 14. A plurality of drive pin connection members 38 are engaged to the threaded bores 35 of the drive pins 14. Thus the second drum member 31 is engaged to the first drum member 27.

The first drum member 27 also includes an annular outer perimeter portion 39 and an annular wall 40 That extends from the plate portion 28. The annular outer perimeter portion 39 is concentric with respect to the annular wall 40. The annular wall 40 has an outermost diameter less than an outermost diameter of said annular outer perimeter portion 39. Thus an outermost edge of the annular outer perimeter portion 39 forms a first lip 41 that extends outward from the annular wall 40.

The second drum member 31 has a circular outer perimeter edge 42. The circular outer perimeter edge 42 is positioned concentrically with respect to the annular wall 40 of the first drum member 27. The circular outermost perimeter edge 42 has a diameter greater than the outermost diameter of the annular wall 40. Thus the circular outer perimeter edge 42 of the second drum member 31 forms a second lip 43 that extends outward from the annular wall 40 when the first drum member 27 is coupled to the second drum member 31. Moreover, the annular wall 40 and the first and second lips 41, 43 form the belt receiving groove 13.

The converter plate 19 includes a neck portion 44. The neck portion 44 properly positions the converter plate 19 in the central opening 29 of the first drum member 27. In addition, the converter plate includes an outer portion 45 that is adjacent to the neck portion 44. The outer portion 45 has a bearing wall 46 for abutting a portion of the plate portion 28 around the central opening 29 when the converter plate 19 is inserted into the central opening 29.

In use, the mechanical torque enhancing assembly 10 may be connected to a pulley 47 on an output shaft 48 by a belt 49. The belt 49 turns the mechanical torque enhancing assembly 10 when the output shaft 48 turns. Moreover, when the mechanical torque enhancing assembly 10 turns, the axle 18 turns providing an output torque. The output torque of the axle 18 is greater than it would have been if a standard pulley mechanism had been used because each of the drive panels 15 acts as a lever and the converter plate 19 acts as a fulcrum.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mechanical assembly comprising:

a drum assembly having an interior space, a belt receiving groove extending around an outer perimeter edge of said drum assembly, and a plurality of drive pins fixedly positioned within said interior space;

a plurality of drive panels positioned within the interior space of said drum assembly;

each of said drive panels having a first end, said first end having a drive pin aperture engaged to an associated one of said drive pins;

an axle having a converter plate, said axle being adapted for providing rotational power to a transmission, said converter plate having a central pin and a plurality of converter plate pins positioned around said central pin; and each of said drive panels having a second end, said second end having a central pin aperture and a plurality of converter plate pin apertures, said central pin aperture receiving said central pin of said converter plate, each of said converter plate pins receiving an associate one of said converter plate pins whereby said second end of each of said drive panels is engaged to said converter plate such that rotation of said drum assembly rotates said converter plate.

2. The mechanical assembly of claim 1, further comprising:

said plurality of converter plate pin apertures of each drive panel including a drive converter plate pin aperture substantially aligned with said central aperture and said drive pin aperture of said drive panel such that said central aperture is positioned between said drive converter plate pin aperture and said drive pin aperture; and said drive converter plate pin aperture being for engaging an associated one of said converter plate pins positioned in alignment with said central pin and said drive pin associated with said drive panel such that said central pin is positioned between said associated one of said converter plate pins and said drive pin associated with said drive panel.

3. The mechanical assembly of claim 2, further comprising:

said plurality of converter plate pin apertures of each drive panel including a plurality of clearance apertures, each clearance aperture being for receiving a respective one of said converter plate pins.

4. The mechanical assembly of claim 1, further comprising:

said drum assembly including a first drum member having a plate portion having a central opening for receiving said converter plate;

said central pin of said converter plate having a distal threaded portion;

said drum assembly including a second drum member, said second drum member having a central hole for receiving said distal threaded portion of said central pin therethrough; and a connection member for engaging said distal threaded portion whereby said second drum member is engaged to said converter plate.

5. The mechanical assembly of claim 4, further comprising:

a plurality of spokes extending outwardly from said central opening;

said drive pins extending from said plate portion, each of said drive pins having a threaded bore therein;

said second drum member having a plurality of connection apertures, each of said connection apertures being alignable with an associated one of said threaded bores of said drive pins; and a plurality of drive pin connection members, each of said drive pin connection members being engageable to said threaded bores of said drive pins, whereby said second drum member is engaged to said first drum member.

6. A mechanical assembly comprising:

a drum assembly having an interior space, a belt receiving groove extending around an outer perimeter edge of said drum assembly, and a plurality of drive pins positioned within said interior space;

a plurality of drive panels positioned within the interior space of said drum assembly;

each of said drive panels having a first end, said first end having a drive pin aperture engaged to an associated one of said drive pins;

an axle having a converter plate, said axle being adapted for providing rotational power to a transmission, said converter plate having a central pin and a plurality of converter plate pins positioned around said central pin;

each of said drive panels having a second end, said second end having a central pin aperture and a plurality of converter plate pin apertures, said central pin aperture receiving said central pin of said converter plate, each of said converter plate pins receiving an associate one of said converter plate pins whereby said second end of each of said drive panels is engaged to said converter plate such that rotation of said drum assembly rotates said converter plate;

said drum assembly including a first drum member having a plate portion having a central opening for receiving said converter plate;

said central pin of said converter plate having a distal threaded portion;

said drum assembly including a second drum member, said second drum member having a central hole for receiving said distal threaded portion of said central pin therethrough; and a connection member for engaging said distal threaded portion whereby said second drum member is engaged to said converter plate;

said first drum member including an annular outer perimeter portion and an annular wall extending from said plate portion, said annular outer perimeter portion being concentric with respect to said annular wall, said annular wall having an outermost diameter less than an outermost diameter of said annular outer perimeter portion whereby said an outermost edge of said annular outer perimeter portion forms a first lip extending outwardly from said annular wall; and said second drum member having a circular outer perimeter edge, said circular outer perimeter edge being positioned concentrically with respect to said annular wall, said circular outermost perimeter edge having a diameter greater than said outermost diameter of said annular wall whereby said circular outer perimeter edge of said second drum member forms a second lip extending outwardly from said annular wall when said first drum member is coupled to said second drum member whereby said annular wall and said first and second lips form said belt receiving groove.

7. A mechanical assembly comprising:

a drum assembly having an interior space, a belt receiving groove extending around an outer perimeter edge of said drum assembly, and a plurality of drive pins positioned within said interior space;

a plurality of drive panels positioned within the interior space of said drum assembly;

each of said drive panels having a first end, said first end having a drive pin aperture engaged to an associated one of said drive pins;

an axle having a converter plate, said axle being adapted for providing rotational power to a transmission, said converter plate having a central pin and a plurality of converter plate pins positioned around said central pin;

each of said drive panels having a second end, said second end having a central pin aperture and a plurality of converter plate pin apertures, said central pin aperture receiving said central pin of said converter plate, each of said converter plate pins receiving an associate one of said converter plate pins whereby said second end of each of said drive panels is engaged to said converter plate such that rotation of said drum assembly rotates said converter plate;

said drum assembly including a first drum member having a plate portion having a central opening for receiving said converter plate;

said central pin of said converter plate having a distal threaded portion;

said drum assembly including a second drum member, said second drum member having a central hole for receiving said distal threaded portion of said central pin therethrough; and a connection member for engaging said distal threaded portion whereby said second drum member is engaged to said converter plate;

said converter plate including a neck portion for positioning in said central opening of said first drum member; and said converter plate including an outer portion adjacent to said neck portion, said outer portion having a bearing wall for abutting a portion of said plate portion around said central opening when said converter plate is inserted into said central opening.

8. The mechanical assembly of claim 6, further comprising:

said plurality of converter plate pin apertures of each drive panel including a drive converter plate pin aperture substantially aligned with said central pin aperture and said drive pin aperture of said drive panel such that said central pin aperture is positioned between said drive converter plate pin aperture and said drive pin aperture;

said drive converter plate pin aperture being for engaging an associated one of said converter plate pins positioned in alignment with said central pin and said drive pin associated with said drive panel such that said central pin is positioned between said associated one of said converter plate pins and said drive pin associated with said drive panel;

said plurality of converter plate pins of each drive panel including a plurality of clearance apertures, each clearance aperture being for receiving a respective one of said converter plate pins;

a plurality of spokes extending outwardly from said central opening;

said drive pins extending from said plate portion, each of said drive pins having a threaded bore therein;

said second drum member having a plurality of connection apertures, each of said connection apertures being alignable with an associated one of said threaded bores of said drive pins;

a plurality of drive pin connection members, each of said drive pin connection members being engageable to said threaded bores of said drive pins, whereby said second drum member is engaged to said first drum member;

said converter plate including a neck portion for positioning in said central opening of said first drum member;

said converter plate including an outer portion adjacent to said neck portion, said outer portion having a bearing wall for abutting a portion of said plate portion around said central opening when said converter plate is inserted into said central opening.

* * * * *